United States Patent

[11] 3,593,371

| [72] | Inventor | Richard E. Driscoll<br>Monroe, La. |
|---|---|---|
| [21] | Appl. No. | 880,444 |
| [22] | Filed | Nov. 28, 1969 |
| [23] | | Division of Ser. No. 705,811, Feb. 15, 1968, Pat. No. 3,535,412. |
| [45] | Patented | July 20, 1971 |
| [73] | Assignee | Cities Service Company |

[54] APPARATUS FOR PRODUCING IMPROVED PELLETS OF A POWDER
15 Claims, 10 Drawing Figs.

[52] U.S. Cl. .................................................. 18/1 B, 264/117
[51] Int. Cl. .................................................. B29c 23/00, B29b 1/02, R01j 2/10
[50] Field of Search .......................................... 18/1 B, 1 C, 2.4, 2.5 R, 2.5 M, 12 SN; 241/38, 41; 23/313, 314; 264/117

[56] References Cited
UNITED STATES PATENTS

| 2,044,563 | 6/1936 | Carter | 241/38 |
| 2,805,156 | 9/1957 | Payne et al. | 162/55 |
| 3,304,355 | 2/1967 | Pobst, Jr. et al. | 264/117 |
| 3,326,642 | 6/1967 | Ruble | 264/117 X |
| 3,333,038 | 7/1967 | Walenciak | 264/117 |
| 3,186,687 | 6/1965 | Askew, Jr. et al. | 18/1 A X |
| 3,353,208 | 11/1967 | Fergus | 18/1 A |

Primary Examiner—J. Spencer Overholser
Assistant Examiner—R. L. Spicer, Jr.
Attorneys—William G. Pulliam and J. Richard Geaman ABSTRACT: A powdered material is transformed into generally spherical pellets so that the bulk density of the material is increased while making it nicer to handle and cheaper to transport. Generally a liquid pelletizing medium is uniformly distributed throughout the cross section of a mass of the powder as it is subjected to vigorous mechanical agitation while advancing through an elongated zone of agitation.

When pelletizing carbon blacks, pellets may be produced which have novel physical characteristics as regards the mass strength to crushing strength ratio of the pellets.

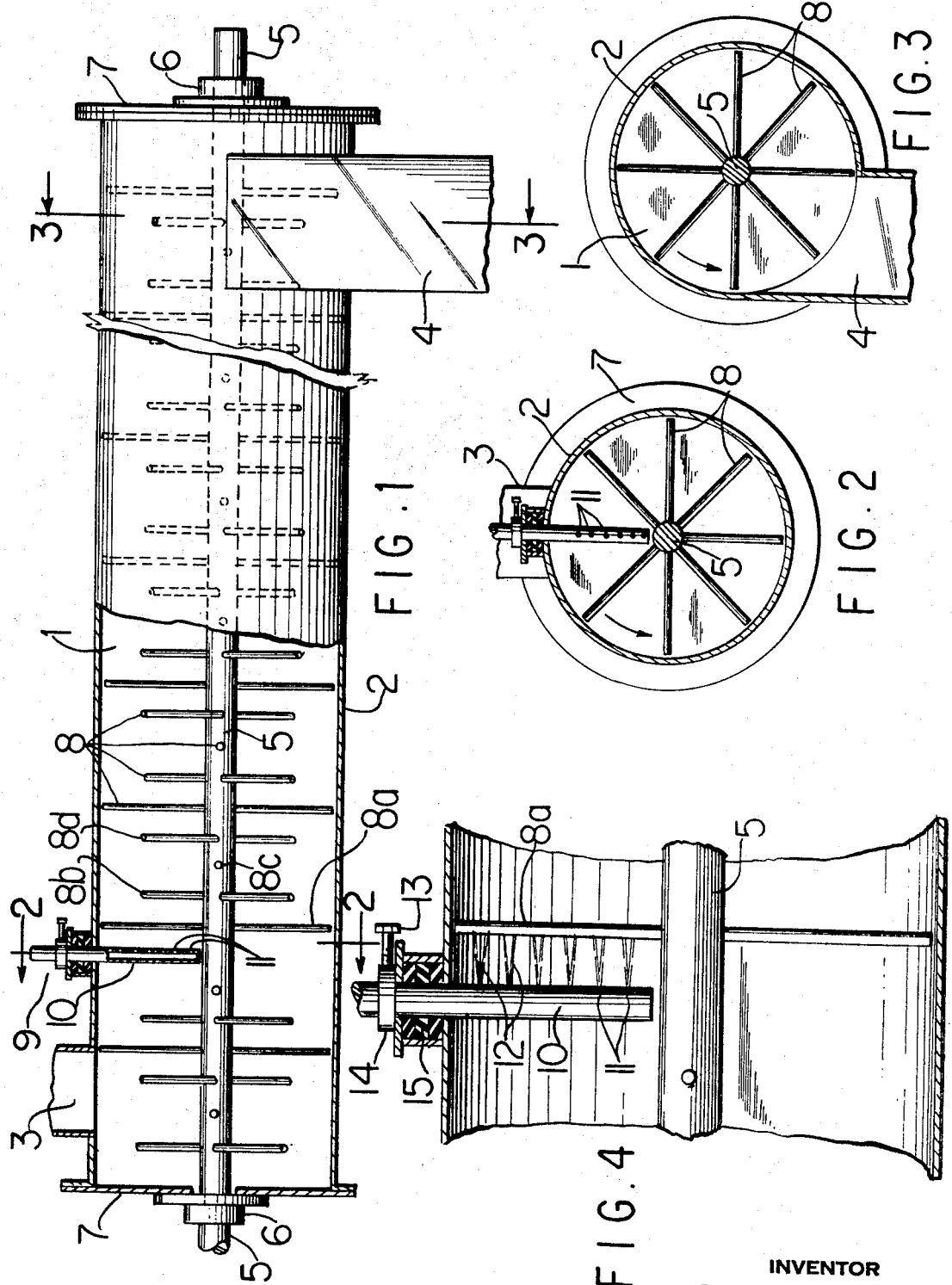

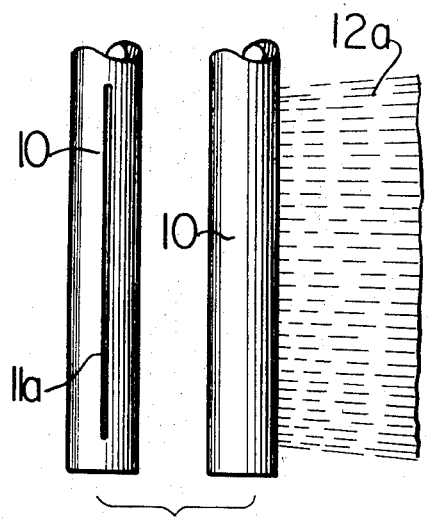
FIG.5
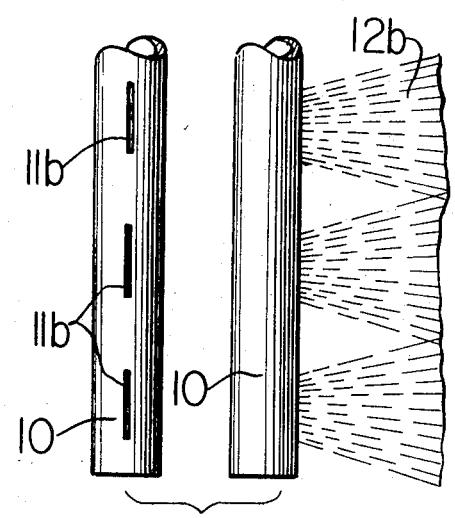
FIG.6
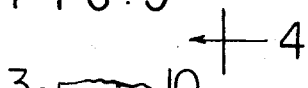
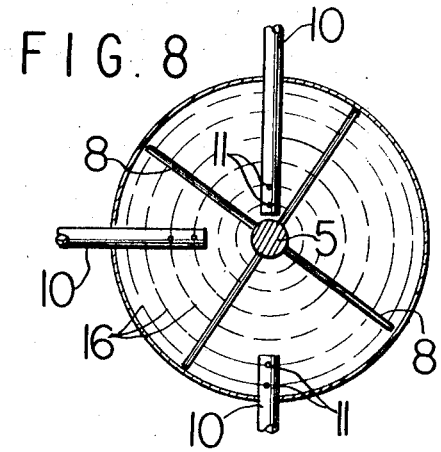
FIG.8
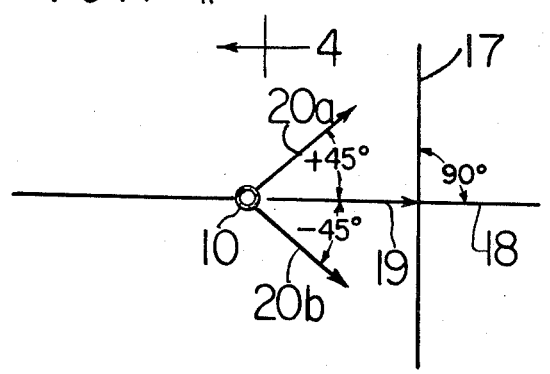
FIG.7  FIG.10
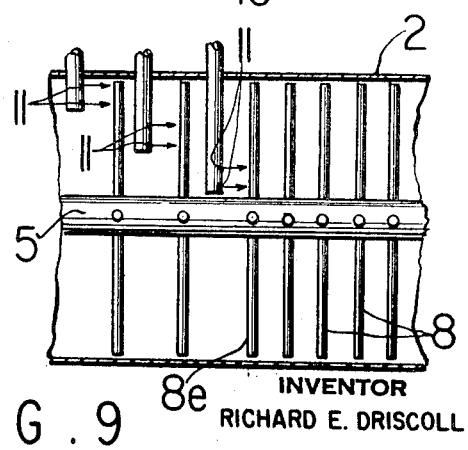
FIG.9
INVENTOR
RICHARD E. DRISCOLL

APPARATUS FOR PRODUCING IMPROVED PELLETS OF A POWDER

This application is a division of application Ser. No. 705,811 filed Feb. 15, 1968 now U.S. Pat. No. 3,535,412.

BACKGROUND OF THE INVENTION

1. Field of Invention

The present invention pertains to improved process and apparatus for mixing powder and a liquid pelletizing medium during a wet pelletizing process which involves subjecting a mass of the wetted powder to the action of longitudinally spaced, agitating members which are rotated for transection of the mass as it advances through an elongated zone of agitation. More specifically, the invention pertains to wet pelletization of carbon black to produce friable carbon black pellets having improved physical characteristics. Accordingly, the process and apparatus of the present invention may be utilized for wet pelleting rubber grade furnace black to produce pellets thereof having novel characteristics.

2. Description of the Prior Art

Certain prior art processes for the wet pelletization of powdered materials involve tumbling the powder in the presence of droplets of a liquid pelletizing medium, e.g. water or a dilute aqueous solution of a binder, by subjecting a mass of the powder and the liquid to multiple stages of rotational mechanical transection during advancement of the mass through an elongated agitation zone. Processes of this general type, and the apparatus by which they may be accomplished, are described and illustrated in U.S. Pat. Nos. Re. 21,379; 2,213,056; 2,288,087; 2,306,698; 2,550,802; 2,861,294; 2,924,847; and 3,304,355. As illustrated therein, powder and a liquid pelletizing agent are introduced into an elongated conduit having an inlet for the powder and removed outlet for discharging pellets. A rotatable shaft member extends axially into the conduit and is provided with a series of longitudinally spaced agitating members which extend radially from the shaft to the proximity of the inside surface of the elongated conduit. During operation, the powder and the liquid pelletizing medium are fed into the elongated conduit at controlled rates while the axial shaft is rotated at relatively constant speed. Repeated contact of the rotating agitating members with the mass of powder tumbles the powder particles and causes the powder mass to advance from the powder inlet toward the pellet discharge outlet. Mixing of the liquid pelletizing agent with the powder and tumbling of the wetted powder particles to form pellets is accomplished primarily by repeated transection of the wetted powder mass by the agitating members as the mass advances through the conduit. The resultant wet pellets may be subsequently dried, if necessary, to produce essentially dry pellets; i.e. pellets in which the liquid content has been reduced to a commercially acceptable level.

These prior processes may be successfully employed for the pelletization of carbon black and other powdered materials which are subject to pelletization with a liquid medium. However, they suffer the disadvantage of inadequate control over critical physical properties of the resultant pellets; notably, pellet size, shape, strength and bulk density. It is, for instance, generally desirable that the pellets be as nearly spherical and as uniform in size as possible while having high resistance to compaction when massed together (mass strength), yet low resistance to crushing force applied to the individual pellets (crushing strength). It is also desirable that the pellets have a relatively high bulk density.

The aforementioned properties of pellet shape, size, strength and density are important since they determine the bulk handling and processing characteristics of the pelletized product. Pellets of irregular size and shape are more inclined to bridge over in hopper cars and plug transporting conduits than are pellets of more spherical shape and uniform size. Pellets with low mass strength are more likely to pulverize and compact during shipment and handling, and if the crushing strength is too high, thorough redispersion of the powder may be extremely difficult or impossible, e.g. it may not be possible to effectively disperse the carbon black particles in rubber by the conventional practice of masticating a mixture of pelletized carbon black with dry rubber by means of a Banbury or roll mill. Furthermore, forming the pellets to a nonuniform size may disadvantage the pelletizing process itself since it is common practice to separate and recycle unacceptably large or small pellets to the pellet mill for reprocessing, and the effective production rate of pellets becomes increasingly handicapped as the recycle rate of these rejects increases.

Pellets which are relatively low in bulk density are more expensive to ship in bulk than pellets having a higher density since shipping costs are actually determined by the volume that the shipment occupies rather than its weight. This problem is so serious that some powdered products cannot be sold economically unless their bulk density is increased to a certain minimum value prior to shipping.

The present invention is predicated upon the conception that the aforementioned problems which are experienced with the prior art pelletizing processes reside principally in the fact that the means employed therein for mixing of the liquid pelletizing medium with the powder is inadequate for optimization of desirable pellet properties. More specifically, the prior methods of mixing do not provide rapid, uniform wetting of the powder over the entire cross section of the powder column within the elongated agitation zone. Consequently, the rate of formation of pellet nuclei cannot be satisfactorily controlled.

SUMMARY OF THE INVENTION

It is, therefore, an object of this invention to provide improved mixing between a powder and a liquid pelletizing medium in pelletizing processes of the general type which have been previously described herein.

Another object of this invention is to provide process and apparatus for the formation of pellets which are more spherical in shape and uniform in size.

It is another object of this invention to provide process and apparatus for producing pellets characterized by high bulk density.

Still another object of this invention is to provide a carbon black pellet characterized by an exceptionally high mass strength to crushing strength ratio.

Even another object of this invention is to provide a powder pelletizing process whereby the size distribution of the pellets may be controlled at will.

These and other objects, which are accomplished by this invention, will become readily apparent from the following description and the appended claims.

The present invention is employed in conjunction with previous processes for pelletizing powder which involve mixing and tumbling the powder and droplets of a liquid pelletizing agent within an elongated agitation zone which may be bounded, for instance, by an elongated hollow cylinder. The agitation is effected by subjecting a mass of the powder and liquid to multiple stages of rotational mechanical transection as the mass of powder and liquid advances through the elongated agitation zone. Mechanical transection and advancement of the mass is accomplished with a series of longitudinally spaced agitating members affixed to a rotatable shaft which extends axially through the elongated agitation zone, the agitating members extending radially from the shaft to the proximity of the inside surface of the elongated conduit which bounds the zone. Upon rotation of the shaft, the agitating members therefore move through a circular plane of rotation and repeatedly transect the mass of powder and liquid while imparting longitudinal motion to the mass so that it advances axially through the conduit from powder inlet to pellet outlet. During operation, the shaft which carries the agitating members is rotated at a relatively constant rate while powder and the pelletizing liquid are fed to the elongated conduit at controlled rates which result in the formation of discrete wet pellets. Powder is fed into the conduit through the inlet opening in the elongated conduit and the wet pellets discharge through an outlet after being formed by tumbling, of the wetted particles, which results from the multistage transection of the liquid-powder mass.

In prior processes, the liquid pelletizing medium was added to the powder mass within the agitation zone without particular regard to the manner in which the liquid was injected for mixture with the powder since it was generally considered that sufficient liquid-solids blending was accomplished by the mechanical transection alone. Therefore, the technique by which liquid was supplied to the powder-liquid mixing zone remained a matter of secondary consideration. The liquid was added either transversally into the elongated agitation zone as is shown in U.S. Pat. Nos. Re.: 21,379; 2,306,698; 2,550,802; 2,861,294 and 3,304,355 or longitudinally into the agitation zone as shown in U.S. Pat. Nos. 2,213,056; 2,288,087 and 2,924,847, but in no case was the addition of liquid made in such a manner as to provide uniform distribution thereof throughout the cross section of the powder mass as it advances through the agitation zone.

In accordance with the present invention the liquid pelletizing medium is injected into the agitation zone from one or more points of injection located within the agitation zone so that the liquid is quickly and thoroughly distributed substantially uniformly over the cross section of the powder mass as it advances through the conduit. Accordingly, the liquid pelletizing medium may be injected parallel to the plane of rotation of the agitating members, but more generally the liquid is injected longitudinally into the elongated agitation zone and is directed to intersect the rotational plane of one or more states of mechanical transection, while also intercepting the site of transection during agitation of the powder mass within the one or more transection stages. Thus, the liquid is uniformly mixed throughout the cross section of the advancing powder mass when it leaves the last transection stage into which the liquid is directed for interception with the site of transection of the powder mass therein, and uniform distribution of the liquid throughout the powder mass may be accomplished prior to substantial pelletization of the powder particles. If the advancing powder mass occupies substantially the entire cross section of the elongated agitation zone at the mixing site, the liquid is injected into the powder mass in such a manner that the liquid is distributed substantially evenly across the radial dimension of the last rotational plane of transection into which it is injected for interception with the site of transection of the powder mass. In such cases it is not essential that the liquid be injected into the cross section of the powder mass from a series of jets which are located on a common radius of the elongated agitation zone since the invention also anticipates the use of a single as well as plural jets which are staggered radially and/or longitudinally in respect to the cross section of the advancing powder mass. In practice, the liquid pelletizing medium may be injected from one or more specially adapted jets which cast a thin planar sheet of the liquid into the plane of rotation of one or more transection stages. Alternately, the liquid may be injected as a series of thin, spaced-apart, essentially columnar streams from a multiplicity of jets, but in either case the liquid injection arrangement should provide substantially uniform distribution of the liquid throughout the cross section of the powder mass upon advancement of the mixture from the last stage of transection into which the liquid is injected for interception with the site of transection of the powder mass in the plane.

To facilitate dispersion and distribution of the liquid pelletizing medium throughout the powder mass, the jets for injecting the liquid should be located proximal to the rotational plane of the agitating members toward which the liquid is directed for intersection; and if more than one of such planes is involved they should be consecutive, or at least close together, since dispersion and rapid distribution of the liquid throughout the powder, prior to substantial pelletization thereof, is greatly facilitated.

Uniform distribution of the liquid over the cross section of the powder mass is thus accomplished in part by rotation of the agitating members, i.e. as the members rotate they collide with the one or more longitudinally directed liquid streams, are thus wetted, and carry the liquid in a circular path while moving transversally through the powder mass. It will also be appreciated that forceful collision of the pelletizing medium with the agitating members as they transect the powder mass greatly enhances atomization and distribution of the liquid throughout the mass. Alternately, the liquid may be injected parallel to the plane of rotation of the agitating members, in which case the liquid is distributed uniformly into the cross section of the powder mass and thorough mixing of powder and liquid occurs when the mass advances into the transection stages.

In one simple though highly preferred embodiment of the invention, the liquid pelletizing medium is injected longitudinally into the agitation zone as a plurality of essentially coplanar and parallel streams which are discharged from equispaced jets arranged along a line which is essentially perpendicular to the axis of the elongated conduit and which extends from the periphery of the rotatable shaft to the inside wall of the conduit and intersects the shaft at a point near the plane of rotation of one or more agitating members. Accordingly, the jets are directed into either the upstream or downstream face of the plane of rotation for perpendicular or angular intersection of the liquid therewith. To effect this arrangement, the jets may be located in the wall of a pipe which extends transversally into the agitation zone to the proximity of the rotatable shaft so that the one or more agitating members pass closely in front of the jets during rotation.

Since important physical properties of the pellets can be controlled by regulating the angle at which the pelletizing liquid intersects the plane of rotation of the agitating member, it is frequently desirable to adapt the jet-bearing conduit for at least partial rotation about its axis, and for maximum flexibility of control this conduit should be rotatable through an angle of at least 90° to either side of the longitudinal axis of the elongated conduit which bounds the agitation zone. Accordingly, the angle of injection of the liquid in respect to the plane of rotation may be varied over 180°, i.e. from perpendicular in respect to the plane to 90° on either side of perpendicular with respect to the plane. When the liquid is to be injected into the agitation zone only in longitudinal direction, the conduit may be arranged for rotation through only 90°, i.e. from perpendicular in respect to the plane of rotation to 45° on either side of perpendicular with respect to the plane.

As previously stated, the invention may be employed with any powdered material which is subject to wet pelletization, and it has been used to advantage for pelleting carbon blacks with aqueous pelletizing media which are predominately water, e.g. 96—99 percent water by weight, the remainder being essentially a bead binder. However, the invention has been used to particular advantage while using plain water as the pelletizing medium, i.e. water which does not contain a binder material, since most amazingly, binder-free pellets of rubber grade furnace blacks may be produced which have uniquely high mass strength to crushing strength ratios. Previously, it was not possible to wet-pelletize rubber grade furnace blacks to produce pellets of sufficient mass strength unless a binder such as sugar was employed, in which case the crushing strength of the pellets was incidentally increased as well. In accordance with the present invention, pellets of rubber grade furnace black can be produced which have high mass strength (sometimes previously referred to as "packing point") an unusually low crushing strength whereby the ratio of one to the other, respectively, is in excess of about 12/1, and quite commonly in excess of 17.3/1 while the mass strength is within the range of about 20 to about 100 pounds. Heretofore it has not been possible to wet-pelletize rubber grade furnace blacks by any process, while employing an aqueous pelletizing medium which is predominately water, to produce essentially dry pellets having mass strength to crushing strength ratio that exceeds about 17.3/1. Furthermore, it has not been previously possible to form essentially dry pellets of rubber grade furnace black which have a mass strength to crushing strength ratio in excess of about 12/1 when employing water as a pelletizing medium and multiple stages of rotational mechanical transection to form pellets of the wetted powder particles. Rubber grade furnace blacks which possess such characteristics represent a significant and very valuable advancement in the art since they may be produced without the use of an extraneous binder such as sugar, yet which still resist crumbling during shipping and handling while being readily pulverizable during processing for redispersion of the powder particles.

When using the present invention for pelletizing carbon blacks with an aqueous medium which is predominantly water, or when plain water is employed, the liquid should be injected into the agitation zone at a velocity of at least about 10 feet per second and generally at a velocity which is within the range of about 10 to about 50 feet per second. For particularly advantageous results, rotational mechanical transection of the carbon black powder should be effected at a speed of about 1,500 to about 2,500 feet per minute when measured at the periphery of the plane of transection. The proportion of aqueous medium to carbon black which is introduced into the mixing site will generally reside within the range of about 0.5 to about 1.8 pounds of liquid per pound of black, and the ratio is frequently about 1/1.

Once the powder and liquid have been thoroughly mixed in accordance with the present invention, the resultant blend is then subjected to tumbling in accordance with prior practices to form pellets by subjecting the blend to numerous other stages of mechanical transection within the agitation zone. Subsequently, the wet pellets may be dried to remove excess liquid, e.g. water, by conventional drying procedures to produce essentially dry pellets. In this respect it should be pointed out that some carbon black pellets are considered essentially dry even when having a moisture content as high as 5 to 10 percent by weight, since they are somewhat hygroscopic and cannot easily be maintained absolutely dry.

BRIEF DESCRIPTION OF THE DRAWINGS

FIG. 1 is a fragmentary vertical side view, partly in section, of a pelletizing apparatus for forming pellets in accordance with the invention.

FIG. 2 is a sectional view taken along the line 2-2 of FIG. 1.

FIG. 3 is a sectional view taken along the line 3-3 of FIG. 1.

FIG. 4 is a fragmentary vertical side view, in section and somewhat enlarged, of the pelletizer of FIG. 1 in the vicinity of line 2-2 and shows one manner in which a liquid pelletizing medium is injected for mixture with powder in accordance with the present invention.

FIG. 5 illustrates an alternative pattern of injecting the liquid pelletizing medium into the pelletizer of FIG. 1.

FIG. 6 illustrates still another pattern of introducing the liquid pelletizing medium into the pelletizer of FIG. 1.

FIG. 7 is a fragmentary vertical side view, in section, of a pelletizer wherein the jets for introducing the liquid pelletizing medium are staggered radially to provide uniform introduction of the liquid into the cross section of the powder mass in the pelletizer.

FIG. 8 is a sectional view taken along line 4-4 of FIG. 7.

FIG. 9 is a fragmentary vertical side view, in section, of a pelletizer wherein the jets for introducing the liquid pelletizing medium are staggered longitudinally to provide uniform introduction of the liquid into the cross section of the powder mass in the elongated conduit.

FIG. 10 is a sketch showing the geometric relationship between the elements involved in mixing of solid and liquid in accordance with the invention, i.e. the plane of rotation of the agitating members, the axis of rotation thereof, and the intercept angle of the liquid streams with the plane of rotation.

DESCRIPTION OF THE PREFERRED EMBODIMENTS

In FIG. 1, an elongated agitation zone 1 is bounded by a cylindrical conduit 2. The conduit has an inlet opening 3 for feeding powder to the elongated agitation zone and an outlet 4 for discharging wet pellets therefrom. A rotatable shaft 5 extends axially through the conduit and is supported by bearings 6 mounted on end closure flanges 7. A series of longitudinally spaced agitating members 8, for repeated transection of the powder mass as it advances through the agitation zone 1, are affixed to the shaft 5 and extend radially therefrom to the proximity of the inside wall of the conduit 2. In the arrangement shown in FIG. 1, the agitating members 8 are arranged in a helical pattern around the shaft 5, but an in-line pattern or other patterns maya be employed when it is preferable and practical to do so.

The conduit is provided with an injector assembly, generally represented at 9, for introducing the liquid pelletizing medium into the conduit for mixture with the powder therein. A liquid supply conduit 10 extends transversally into the elongated conduit 2 to the proximity of the rotatable shaft 5. The internal extension of the conduit 10 is provided with a series of equispaced jets 11 which are directed into the plane of rotation of the agitating members 8, so that liquid streams of the liquid pelletizing medium, as are generally represented at 12 in FIG. 4, intercept the agitating members 8a, 8b, 8c and 8d, and thus intersect the rotational planes of those members at the site of transection of the powder mass during agitation thereof with the members. More particularly the liquid collides only with members 8a, 8b, 8c and 8d and cannot intercept subsequent members at the site of transection of the powder mass.

By references to FIGS. 1, 2 and 4 it can be seen that the jets 11 are directed perpendicularly into the planes of rotation of the agitating members, but it will be understood that other angles of intersection between the streams 12 and the planes of rotation may be employed. Thus the conduit 10 maybe at least partially rotatable about its axis to provide variation of the intersection angle. A locking screw 13 extends through bushing 14 and may be tightened to secure the conduit 10 at the proper depth of insertion and at the selected angular relationship of the jets with the planes of rotation once the conduit has been positioned. A packing gland, generally represented at 15, provides a seal between the agitation zone and the outside atmosphere.

Alternate arrangements of jets may be employed for injecting the liquid pelletizing medium into the plane of rotation of one or more agitating members. As shown in FIG. 5, the conduit 10 may be provided with a long, slitlike jet 11a which casts a thin planar sheet of the liquid, such as is generally represented at 12a, to uniformly cover the radial cross section of the powder mass at the plane of rotation of the agitating member, i.e. at the plane of rotational mechanical transection of the powder mass. A series of slitlike jets 11b, as are illustrated in FIG. 6, may also be employed to cast a plurality of thin planar sheets of the liquid, 12b.

Alternative loci may also be employed for the jets. As shown in FIG. 2, the jets 11 are all located on a common radius of the cross section of the elongated conduit 1. As may be seen in FIGS. 7 and 8, however, the jets may be located on different radii, i.e. staggered radially, while nonetheless effecting uniform distribution of the liquid over the entire cross section of the conduit 2; for as was previously stated, the agitating members are thoroughly wetted by the liquid streams so that the liquid is carried around and distributed uniformly over the cross section of the powder mass as illustrated by the broken circular lines 16. The jets may also be staggered longitudinally as is shown in FIG. 9 so that uniform distribution of the liquid over the cross section of the agitation zone occurs as the powder advances through the last transection stage into which the liquid is injected, i.e. the rotational plane of agitating members 8e, since the powder mass advances from left to right. As the powder mass advances from the transection stage of agitating members 8e, the liquid distribution pattern throughout the mass will resemble that shown by the broken lines 16 in FIG. 8.

The previous description in references to FIGS. 1—9 has been with regard to operating conditions which result in filling of the agitation conduit with powder at the locus of mixing with the liquid pelletizing agent. However, it will be understood that the agitator can be operated to form pellets without entirely filling the cross section of the conduit, and in those cases the powder advances through the mixing locus as an annular mass which conforms to the wall of the conduit. Accordingly, the pelletizing agent should be injected for uniform distribution over the cross section of this annular mass, there being no need to inject liquid into the hollow center thereof, and the jets 11 may all be located more distally from the rotatable shaft 5.

In FIG. 10, line 17 represents an edgewise view of the plane of rotation of one stage of mechanical transection into which the liquid is injected. Line 18 represents the axis of rotation of the plane. The jet-bearing conduit 10 is seen in sectional view. Normally, the agitating members will extend perpendicularly from the rotatable shaft so that the plane of transection is perpendicular to its axis of rotation. At any rate, the liquid streams which are projected from the conduit 10 are directed to intersect the face of the plane, rather than the edge thereof, and ideally the angle of the intersection will be either perpendicular, as represented by line segment 19, or within a range of about 45° to either side of perpendicular, as indicated by lines 20a and 20b. As previously indicated, the liquid can be directed into either face of the plane of rotation, i.e. either concurrently or countercurrently with respect to the direction of advance of the powder mass through the elongated agitation conduit.

In practice, the jets 11 should be located proximal, i.e. within a few inches, of the planes of transection into which the streams are directed for atomization and distribution of the liquid by impact with the agitating members. Furthermore, the jets should be located near the powder inlet of the elongated conduit, as illustrated, to permit thorough liquid-solids blending in the earlier transection stages, thus allowing pelletization to occur in the numerous other transection stages as the mass advances toward the discharge outlet. In some instances, however, it may also be desirable to introduce a portion of the liquid pelletizing medium into the region of agitation in which pelletization occurs, and in those cases one or more additional conduits 10 may be inserted further downstream of the powder inlet to the conduit.

During operation, powder and a liquid pelletizing medium are fed into conduit 2 at relatively constant rates through the powder inlet 3 and the liquid supply conduit 10, respectively. The shaft 5 is rotated at an essentially constant rate to advance the powder mass through the conduit and effect sufficient tumbling of the wetted powder in the transection stages to convert the powder into pellets by the time it reaches the discharge outlet 4. Wet pellets which are removed from outlet 4 may then be passed to a pellet polisher and/or a conventional dryer to remove excess liquid, thus converting the wet pellets to dry pellets.

Example 1

Except as otherwise indicated, a pelletizing apparatus essentially as shown in FIGS. 1—4 was employed for converting a HAF-H furnace carbon black powder into pellets. The length of the agitation zone from powder inlet to pellet outlet was about 10 feet and the inside diameter of the agitating conduit was 20 inches. The agitating members had a diameter of five-eighth inch, a length of 18 inches and were spaced longitudinally on 1⅙ inches centers in a helical pattern of 22½° pitch angle.

Two experiments were conducted to demonstrate the superior nature of the invention as regards formation of pellets having more uniform shape and size distribution. In both experiments the HAF-H carbon black powder was fed to the pelletizing apparatus at the rate of about 950 pounds per hour while plain water was introduced at the pelletizing medium at the rate of about 2.3 gallons per minute.

In the first experiment, ex. 1, the water for pelletizing the carbon black powder was injected transversally into the elongated conduit of the pelletizer from a single point located outside of the agitation zone about 15 inches from the powder inlet of the conduit. The injection orifice for the water was essentially circular in configuration, had an inside diameter of about 0.36 inch, and was directed to inject the water perpendicularly with respect to the rotatable shaft of the pelletizer, i.e. transversally with respect to the agitation zone.

In the second experiment, ex. 2, the water for pelletizing the carbon black powder was injected longitudinally into the elongated conduit from a jet-bearing conduit which extended transversally into the elongated conduit from a point located about 15 inches from the powder inlet. The jets for the water were in number on ¾-inch center to center spacing, each having a diameter of 0.0625 inch and directed to inject the water as coplanar and parallel streams for perpendicular intersection with the planes of rotation of the agitating members.

The wet pellets formed in each of these experiments were then subjected to identical polishing operations and dried by heat at substantially identical conditions to produce dry pellets having a moisture content below about 1.5 percent by weight.

The dried beads of experiments 1 and 2 were also tested to determine the physical characteristics thereof and the results of the tests are shown in table 1. All of the tests were conducted in conformity with ASTM procedures except the Pellet Crushing Strength Test, which is carried out by determining the force in grams required to crush pellets having a diameter of 500 microns. The pellets which are crushed are those retained in the interstices of the 35-mesh screen used in the Pellet Size Distribution Test. After removal from the screen, force is applied progressively to the top side of individual pellets which rest on a flat, nonyielding surface. The force is applied to the pellet surface through a flat surface, i.e. a glass slide, rather than through a sharp edge or point. When the pellet is crushed, the force required in grams is recorded. The forces required to crush 20 of the pellets are averaged to obtain the crushing strength value of any given sample of pelletized carbon black. It will, therefore, be appreciated that the crushing strength values and mass strength to crushing strength ratios referred to herein involve crushing strength values obtained with 500-micron pellets, and that pellets of larger diameter from the same sample have greater crushing strength while pellets of smaller diameter have lesser crushing strength. Pellets of the 500-micron size are convenient to collect and measure, but it will be understood that pellets of significantly reduced crushing strength may be produced in accordance with the present invention regardless of the pellet size.

TABLE I

| Sample | Pour density,[1] lbs./cu. ft. | Pellet size distribution,[2] wt. percent | | | | | | Industrial fines,[3] wt. percent | Mass strength,[4] lbs. | Crushing strength, grams | Mass strength/ crushing strength |
|---|---|---|---|---|---|---|---|---|---|---|---|
| | | +10 | +18 | +35 | +60 | +120 | −120 | | | | |
| Example 1[5] | 20.1 | | 30.9 | 56.8 | 8.1 | 2.2 | 1.5 | 2.4 | 33.0 | 3.5 | 9.4/1 |
| Example 2[6] | 20.0 | | 1.2 | 38.1 | 47.9 | 10.0 | 2.5 | 5.9 | 30.0 | 1.5 | 20.0/1 |

[1] ASTM D1513-60.
[2] ASTM D1511-60.
[3] ASTM D1508-60.
[4] ASTM D1937-62T.
[5] Moisture content by weight=54% wet; 1.4% dry.
[6] Moisture content by weight=54% wet; 1.5% dry.

It can be seen from table I that the pellets produced in accordance with the present invention, ex. 2, had a pour density equivalent to that of the pellets produced in accordance with the prior art process, ex. 1. The bulk density of the carbon black powder prior to pelletization was about 3 to 5 pounds per cubic foot. It is also significant that the pellets of ex. 2 had a size distribution that was somewhat smaller than the pellets of ex. 1. It is especially significant, however, that the crushing strength value of the pellets of ex. 2 was significantly lower than the value obtained with ex. 1, so that the pellets of ex. 2 had an extraordinary mass strength to crushing strength ratio, i.e. 20/1.

The considerably rounder and smaller pellets of ex. 2 represent a considerable improvement over the more irregularly shaped and larger pellets of ex. 1. Smaller and rounder pellets nestle together better and are less subject to autoattrition by vibration of a static mass of the pellets during shipment. On the other hand, there is no problem in initiating and maintaining flow of the smaller and rounder pellets, so that unloading and handling problems are considerably improved.

Using the same pelletizing apparatus as in experiment 2, additional experiments were run to demonstrate (1) the difference in effect on pellet properties of introducing the liquid pelletizing medium for intersection with the rotating plane and introducing it essentially parallel to the plane, (2) the effect on pellet properties of injecting a liquid pelletizing medium into the agitation zone at different velocities, and (3) the effect on pellet properties of introducing the liquid pelletizing medium into the agitate at different angles of intersection with the rotating planes of the agitation members. In each of the following experiments, the pelletizing medium was plain water and was introduced into the agitation zone essentially in accordance with the arrangement shown in FIG. 1, i.e. from a series of equispaced jets in the wall of a liquid supply conduit which extended transversally into the agitation zone. The liquid pelletizing medium was projected from the jets as essentially coplanar and parallel streams. The point of insertion of the jet-bearing conduit was the same as in experiment 2. In each case, an HAF-H carbon black was the material pelletized. After the pellets were formed in these experiments, they were submitted to a polishing operation wherein the conditions were essentially uniform for each experiment. The resultant wet pellets were then dried with head under controlled conditions to produce dry pellets having a moisture content below about 1.5 percent by weight. Other operating conditions and the results of the experiments are shown in tables II and III.

By reference to table III, it can be seen that the properties of the pellets from exs. 3 and 4 were considerably and significantly affected by the angle at which the streams of water were introduced into the agitation zone in relation to the plane of rotation of the agitating members. By injecting the streams of water perpendicular to the plane (ex. 3) as opposed to parallel to the plane (ex. 4), the size of the pellets become smaller and less random, pour density was increased, mass strength was more than tripled, and crushing strength was considerably reduced. Significantly, a phenomenal mass strength to crushing strength ratio of 31/1 was effected.

Comparing ex 5 with ex. 3, it can be seen that reduction of the velocity at which the water streams were perpendicularly injected into the plane of rotation somewhat reduced the size reduction and mass strength improvement effects upon the pellets. However, it can be seen by comparing the results of exs. 4 and 6 with ex. 5 that the perpendicular injection at lower velocity provided noticeably beneficial effects over parallel injection at higher velocity or angled injection at the same velocity. It should be pointed out, however, that the angled injection of ex. 6 nonetheless resulted in the formation of generally smaller pellets than in ex. 4, and this

TABLE II.—CONDITIONS

| Ex. | Number of jets | Size of jets, inches | Water feed rate, lbs./hr. | Exit velocity of water from jets, ft./sec. | Angle of intercept of water streams with plane of rotation | Carbon black feed rate, lbs./hr., approx. | R.p.m. of axial shaft in pelletizer |
|---|---|---|---|---|---|---|---|
| 3 | 6 | 0.076 | 1,300 | 25.5 | Perpendicular | 1,300 | 540 |
| 4 | 6 | 0.076 | 1,300 | 25.5 | Parallel (No intercept) | 1,300 | 540 |
| 5 | 6 | 0.0935 | 1,500 | 18.5 | Perpendicular | 1,500 | 540 |
| 6 | 6 | 0.0935 | 1,500 | 18.5 | +45° | 1,500 | 540 |
| 7 | 6 | 0.1285 | 1,450 | 11.5 | Perpendicular | 1,450 | 540 |
| 8 | 6 | 0.1285 | 1,450 | 11.5 | +45° | 1,450 | 540 |
| 9 | 6 | 0.1285 | 1,450 | 11.5 | −45° | 1,450 | 540 |

TABLE III.—RESULTS

| Ex. | Pellet size distribution mesh, wt. percent | | | | | | Industrial fines, wt. percent | Pour density, lbs./cu. ft. | Mass strength lbs. | Crushing strength, grams | Mass strength/ crushing strength |
|---|---|---|---|---|---|---|---|---|---|---|---|
| | +10 | +18 | +35 | +60 | +120 | Pan | | | | | |
| 3 | 0.15 | 10.93 | 48.57 | 35.42 | 2.95 | 1.97 | 0.40 | 21.3 | 59 | 1.9 | 31/1 |
| 4 | 20.21 | 56.07 | 19.80 | 1.95 | 1.42 | 0.53 | 2.80 | 19.7 | 16 | 3.5 | 4.6/1 |
| 5 | 0.33 | 35.0 | 50.85 | 13.50 | 0.25 | 0.05 | 0.0 | 21.3 | 48 | 1.9 | 25.3/1 |
| 6 | 8.21 | 56.74 | 31.71 | 2.94 | 0.15 | 0.25 | 0.80 | 20.7 | 41 | 4.3 | 9.5/1 |
| 7 | | 31.17 | 61.85 | 6.82 | 0.09 | 0.04 | 0.0 | 20.5 | 36 | 3.3 | 10.9/1 |
| 8 | 4.48 | 66.51 | 22.96 | 4.98 | 0.78 | 0.24 | 2.00 | 19.8 | 20 | 4.1 | 4.9/1 |
| 9 | 0.16 | 53.40 | 42.85 | 1.87 | 0.94 | 0.31 | 0.39 | 19.8 | 22 | 2.1 | 10.5/1 | difference alone represents an improvement and demonstrates a control feature provided by angulation of the injected streams of liquid pelletizing medium.

In ex. 7, which involved perpendicular injection of the liquid at the lowest relative velocity, improvement in mass strength and reduction in crushing strength is less evident, but the pour density of the pellets was still acceptable and the pellet size was generally smaller than in exs. 3 and 5.

Exs. 8 and 9 demonstrate the effects of angulation when the liquid streams are directed to intercept the agitating members as the members rotate toward (ex. 8) and away from (ex. 9) the jets. Although the pellets of ex. 8 were not generally as small as those of ex. 7, there is still some improvement in this respect, and also in the mass strength, of the pellets produced in ex. 4. The same may be said for the pellets of ex. 9, except that the mass strength, crushing strength and the ratio thereof, represent definite improvements over ex. 4. Furthermore, ex. 9 in general produced pellets having better crushing strength and size distribution characteristics than were effected by ex. 8.

Valid comparisons can also be made between ex. 1 and exs. 3—9. It can be seen from ex. 4, example, that the pellets were generally largest when the pelletizing medium was injected parallel to the plane of rotation from a series of equispaced jets, and the pellets were, in fact, generally larger than the liquid was injected from a single jet located outside the periphery of the plane in accordance with the prior art method, ex. 1. Injection of the liquid streams for angular interception with the plane of rotation of the agitation members, exs. 6, 8 and 9, also produced pellets which were generally larger than in ex. 1. It will be appreciated, therefore, that the present invention provides a method whereby the size distribution of the pellets may be controlled at will, a feature not heretofore available, when the pelletizing medium is released into the powder mass from one or more points of injection inside the agitation zone, while being directed within the range of parallel to perpendicular in respect to the plane of rotation of the agitating members.

While the invention has been described with reference to aqueous pelletizing media, particularly ordinary water, it will be understood that the invention may be employed for forming pellets with other aqueous media, such as binder solutions or oil emulsions, or even other liquids such as oils.

Therefore, what I claim is:

1. In an apparatus for wet pelletizing powdered material comprising an elongated conduit which bounds an agitation zone within which a mass of wetted powder is agitated to form pellets, a powder inlet opening near one end of said zone and a pellet discharge outlet toward the other end of said zone, a rotatable shaft member extending into said conduit and arranged axially in respect thereto, a series of longitudinally spaced agitating members affixed to said rotating shaft in said agitation zone and extending radially outward from said shaft to the proximity of the inside surface of said elongated conduit, and means for feeding powder and a liquid pelletizing medium into said agitation zone at controlled rates, the improvement which comprises at least one jet located inside said agitation zone, said jet being adapted to inject the liquid pelletizing medium substantially uniformly into the transversal cross section of the powder mass contained within said agitation zone.

2. The apparatus of claim 1 in which the jet is located proximal to the plane of rotation of one or more of said agitating members, said jet being directed into the plane of rotation of the said one or more agitating members and adapted to distribute a liquid pelletizing medium substantially evenly across the radial dimension of the last rotational plane into which the liquid is directed.

3. The apparatus of claim 1 in which the jet is directed in parallel relation to the plane of rotation of the agitating members.

4. The apparatus of claim 2 in which the jet is directed at an angle within the range of about 0 to about ±45° when measured from a line which is perpendicular to the plane of rotation of the agitating members into which the liquid is directed.

5. The apparatus of claim 1 in which said jet is conjunctive with a liquid-supplying conduit which extends transversally into said agitation zone.

6. The apparatus of claim 5 in which a multiplicity of jets are spaced evenly along the internal extension of liquid-supplying conduit.

7. The apparatus of claim 6 in which the multiplicity of the jets have coplanar axes of liquid projecting.

8. The apparatus of claim 5 in which the transversally extending conduit is at least partially rotatable about its axis.

9. The apparatus of claim 8 in which the transversally extending conduit is rotatable through an arc of at least about 90° in respect to the axis of the elongated conduit.

10. The apparatus of claim 5 in which the axis of the transversally extending liquid supplying conduit is perpendicular to the axis of the elongated conduit.

11. In an apparatus for wet pelletizing powdered material comprising an elongated conduit for containing a mass of the powder during agitation thereof, a powder inlet opening near one end of said conduit and a pellet discharge outlet toward the other end of the conduit, a rotatable shaft member extending into said conduit and arranged axially in respect thereto, a series of longitudinally spaced agitating members affixed to said rotatable shaft and extending essentially radially outward therefrom the the proximity of the inside surface of said elongated conduit, and means for feeding powder and a liquid pelletizing medium into elongated conduit at controlled rates, the improvement which comprises at least one jet located inside the elongated conduit, said jet being adapted to inject the liquid pelletizing medium substantially uniformly into the cross section of the powder mass contained by said elongated conduit, and wherein said jet is conjunctive with a liquid-supplying conduit which extends transversally into the elongated conduit which contains the agitating members, and said transversally extending conduit is least partially rotatable about its axis.

12. The apparatus of claim 11 in which a multiplicity of jets are spaced evenly along the internal extension of the liquid-supply conduit.

13. The apparatus of claim 12 in which the multiplicity of jets have coplanar axes of liquid projection.

14. The apparatus of claim 11 in which the transversally extending conduit is rotatable through an arc of at least about 90° with respect to the axis of the elongated conduit.

15. The apparatus of claim 11 in which the axis of the transversally extending liquid-supplying conduit is substantially perpendicular to the axis of the elongated conduit.